United States Patent

Flett et al.

[15] 3,684,333
[45] Aug. 15, 1972

[54] HYDROSTATIC BEARINGS
[72] Inventors: Alexander Flett; Ronald John, both of London, England
[73] Assignee: Molins Machine Company Limited, London, England
[22] Filed: Nov. 18, 1970
[21] Appl. No.: 90,570

[30] Foreign Application Priority Data
Nov. 26, 1969 Great Britain..........57,741/69

[52] U.S. Cl...............................................308/122
[51] Int. Cl................................................F16c 17/10
[58] Field of Search......308/122, 73, DIG. 13, 71, 70

[56] References Cited
UNITED STATES PATENTS 2,307,282   1/1943   Levesque............308/DIG. 13
2,711,934   6/1955   Rickenmann.............308/122

FOREIGN PATENTS OR APPLICATIONS 568,724   4/1945   Great Britain.............308/122

Primary Examiner—Martin P. Schwadron
Assistant Examiner—Frank Susko
Attorney—Emory L. Groff and Emory L. Groff, Jr.

[57] ABSTRACT

A fluid bearing, particularly a hydrostatic bearing, for supporting a rotatable shaft. The bearing surface on the shaft, and the complementary surface on the surrounding bearing member being frusto-conical. The bearing member being movable axially of the shaft to vary the fluid gap.

5 Claims, 2 Drawing Figures

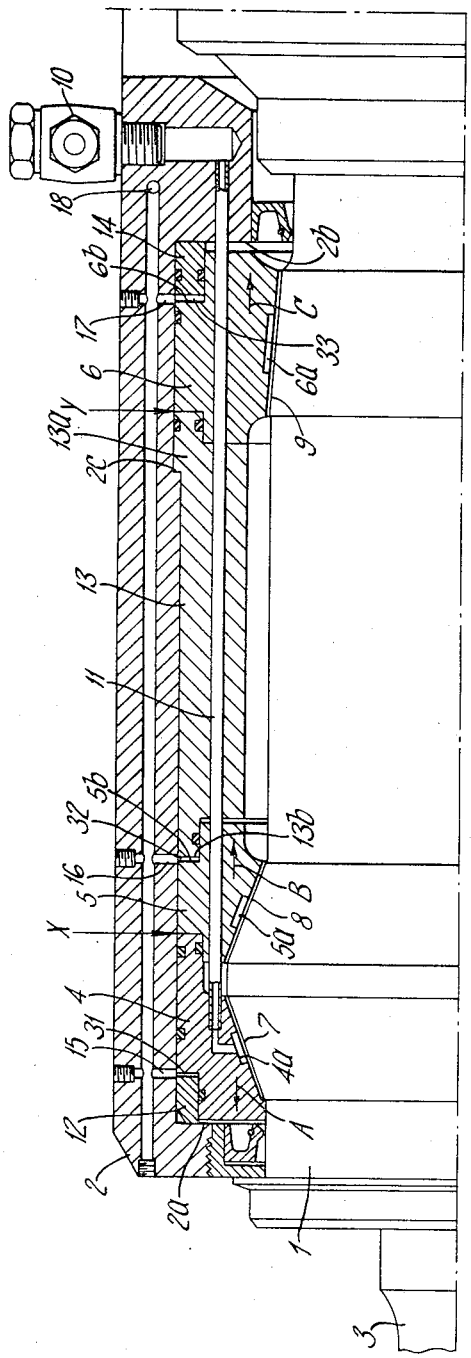
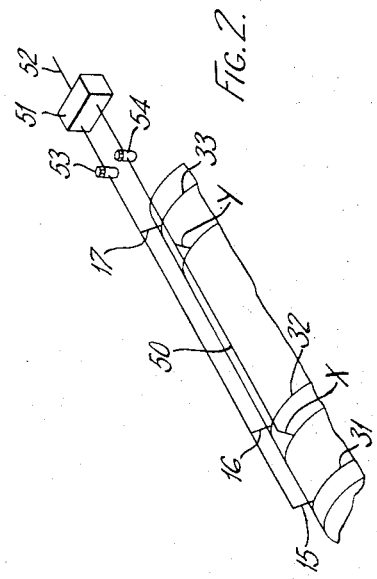
FIG.1.
FIG.2.
INVENTORS
ALEXANDER FLETT
RONALD JOHN
BY Emory L. Groff Atty

HYDROSTATIC BEARINGS

The present invention relates to fluid bearings and more particularly to the incorporation of hydrostatic bearings in machine tools.

U.S. Pat. No. 3,171,327 relates to a twin-spindle milling machine which incorporates hydrostatic bearings. In this machine there are two spindles each of which carries a tool and is movable in a z direction towards and away from a vertically mounted workpiece which itself is movable in the y or vertical direction. The spindles are movable on hydrostatic bearings in both the x and z directions. In addition, the spindles are each mounted for rotation in hydrostatic bearings.

The spindle of such a machine is designed to rotate at speeds of up to 30,000 r.p.m. When starting a spindle from rest, maximum torque is applied to the spindle and in these conditions the hydrostatic bearing must be relatively rigid, i.e. the fluid gap must be small, in order to withstand this torque. However, when the spindle is running at high speed the frictional forces consequent upon a narrow fluid gap result in an appreciable amount of the horse power of the driving motor to be absorbed with a consequent limitation on the maximum speed attainable by the spindle.

The present invention is therefore concerned with providing a fluid bearing in which the fluid gap is variable so that the bearing can be run at low speed with a relatively narrow gap in order to provide the bearing with sufficient rigidity to withstand the applied torque, and the fluid gap can be increased with increasing speed of rotation of the member supported by the bearing so that the frictional forces generated by the fluid of the bearing are reduced with increased speed.

According to the present invention there is provided a rotatable assembly comprising a shaft supported for rotation in a fluid bearing, the shaft having a frusto-conical bearing surface coaxial with the axis of rotation of the shaft, the fluid bearing coacting with the surface on the shaft by being located in a complementarily-shaped surface of a bearing member, means to supply pressure fluid to the bearing, and means to cause relative axial movement between the shaft and the bearing member to vary the fluid gap between the bearing surface of the shaft and the complementarily-shaped surface of the bearing member.

How the invention may be carried out will now be described with reference to the accompanying drawings in which:

FIG. 1 is a fragmentary sectional view of an assembly according to the invention; and FIG. 2 is a diagrammatic view showing a control arrangement that may be used with the embodiment of FIG. 1.

A twin-spindle milling machine of the kind disclosed in the aforementioned patent comprises essentially a vertical workpiece support on which two pallet carrying workpieces to be machined can be supported vertically, a spindle adapted to carry a tool being associated with each of the pallets and being movable in a z direction towards and away from the associated pallet and also in the x direction, each pallet being movable in the y or vertical direction on the workpiece support.

Each of the spindles is mounted in hydrostatic bearings and is drivable up to speeds of 30,000 r.p.m.

The drawings show one of the spindles 1 which is rotatable within a casing 2 and is adapted to carry a tool 3.

The spindle 1 is supported in the casing 2 by three hydrostatic bearings 4, 5 and 6. The spindle 1 has first and second frusto-conical surfaces 7 and 8 respectively which make an obtuse angle with respect to one another; the spindle 1 also has a third frusto-conical surface 9. The frusto-conical surfaces 7, 8 and 9 are associated with the three hydrostatic bearings 4, 5 and 6 respectively.

Bearing fluid under pressure is supplied through an inlet 10 and passage 11 to the bearing pad 4a of the hydrostatic bearing 4. Similar passages to 11 not shown, also supply bearing fluid to the bearing members or pads 5a and 6a of the hydrostatic bearings 5 and 6 respectively.

Each of the bearing members 4, 5 and 6 is slidable axially with respect to the casing 2 to thus vary the depth of the gap between the bearing pads 4a, 5a, 6a and the associated frusto-conical surfaces 7, 8 and 9 respectively on the spindle 1. Axial movement of the bearing pad 4a to the left, as viewed in FIG. 1, causes the depth of the gap to be increased whereas movement to the right causes it to be decreased, and axial movement of the bearing pads 5a and 6a to the right as viewed in FIG. 1 causes the depth of the gap to be increased whereas movement to the left causes it to be decreased.

Movement of the bearing 4 to the left is restricted by an annulus member 12 and by the end 2a of the casing 2; movement to the right is restricted by the bearing 5.

Movement of the bearing 5 to the left is in turn restricted by the bearing 4 and to the right by a substantially cylindrical member 13 through which the axial passage 11 passes.

The bearing 6 is restricted in its movement to the left by the member 13 and its movement to the right by a second annular member 14 and the end 2b of the casing 2. The member 13 has an enlarged diameter portion 13a which abuts a step 2c in the casing 2 to restrict movement of the member 13 to the left with respect to the casing 2.

Because the surfaces 7, 8 and 9 are inclined the supply of bearing fluid under pressure to the bearing pads 4a, 5a and 6a will produce a component of pressure acting in the direction of the three arrows A, B and C respectively tending to increase the depth of the gap between the bearing pads and their associated inclined surfaces on the spindle 1.

These axial components of pressure are counteracted by the application of control fluid pressure to actuating chambers 31, 32 and 33 through passages 15, 16 and 17 supplied from a main passage 18.

Control fluid pressure through passage 15 acts on the bearing 4 and reacts against the annular member 12 to tend to move the bearing 4 to the right as viewed in FIG. 1. Similarly control fluid pressure applied through passage 16 acts on the bearing 5, and reacts against the member 13, to tend to move the bearing 5 to the left as viewed in FIG. 1. Control fluid pressure applied through passage 17 acts against bearing 6 and reacts against the annular member 14 to tend to move the bearing 6 to the left as viewed in FIG. 1. As the area of the annular surface 6b on the bearing 6 is greater than the annular surface 13b on the member 13 the control pressure applied through the passage 17 will overcome the control pressure applied through passage 16 and thus hold the member 13 against the shoulder 2c to render the member 13 fixed relatively to the casing and to the bearing 5.

Thus the bearing gaps associated with the three bearings 4, 5 and 6 can be decreased in depth by the application of control pressure through the passages 15, 16 and 17 to move the bearing 4 to the right, the bearing 5 to the left and the bearing 6 to the left as viewed in FIG. 1. In order to increase the sizes of the bearing gaps an arrangement may be used by which control fluid pressure can be applied at the points X and Y, as indicated in FIG. 1, through a common passage, similar to passage 18, and passages corresponding to passages 15, 16 and 17. Such an arrangement is shown diagrammatically in FIG. 2. This figure shows the surfaces 31, 32 and 33 and the passages 15, 16, 17 and 18 shown in FIG. 1. In addition there is shown a passage 50 which would be provided in the casing in a similar manner to the passage 18. From this passage 18 pressure fluid is supplied to the points X and Y. An inlet 53 similar to the inlet 10 is provided in the casing and supplies pressure fluid to the passage 18. A further inlet 54 supplies pressure fluid to the passage 50. The two inlets 53 and 54 are supplied selectively with pressure fluid from a selector valve 51 supplied with pressure fluid through an inlet pipe 52.

The inclined surfaces on the spindle and associated hydrostatic bearing, could be arranged differently than those shown and more or less numbers of hydrostatic bearing and associated inclined surfaces could be used.

For instance, the two surfaces 7 and 8 and associated bearings 4 and 5 which form an acute angle between them instead of an obtuse angle as illustrated the angles being measured through the bearings and not through the spindle. In this case a single actuating chamber would be located between the two bearings to that control pressure supplied to the actuating chamber would cause the two bearings to move axially away from one another to reduce the bearing gap in each of them.

What we claim as our invention and desire to secure by Letters Patent is:

1. A rotatable assembly comprising a shaft supported for rotation in a hydrostatic bearing, the shaft having a frusto-conical bearing surface coaxial with the axis of rotation of the shaft, the bearing including a bearing member having a complementarily-shaped surface spaced by a fluid gap from the surface of the shaft means to supply pressure fluid to the bearing, first hydraulic means to apply pressure fluid to act on a first face of the bearing member to move it relative to the shaft in a direction to reduce the fluid gap, and second hydraulic means to apply pressure fluid to act on a second face of the bearing member to move it in a direction to increase the fluid gap.

2. An assembly as claimed in claim 1 wherein the shaft has two frusto-conical bearing surfaces tapering in opposite directions, and there is a complementarily-shaped bearing surface by a fluid gap spaced from each bearing surface on the shaft, the complementarily-shaped bearing surfaces being provided on two separate bearing members.

3. An assembly as claimed in claim 2 wherein said first and second hydraulic means are selectively controlled by valve means so that the bearing members are movable in one sense or the other to vary the fluid gap.

4. A rotatable assembly comprising a shaft supported for rotation in a fluid hydrostatic bearing, the shaft having a frusto-conical bearing surface coaxial with the axis of rotation of the shaft, the fluid hydrostatic bearing coacting with the surface on the shaft by being located in a complementarily-shaped surface of a bearing member, means to supply pressure fluid to the bearing, means to cause relative axial movement between the shaft and the bearing member to vary the fluid gap between the bearing surface of the shaft and the complementarily-shaped surface of the bearing member, said shaft including two frusto-conical bearing surfaces tapering away from each other, said complementarily-shaped bearing surfaces being provided on separate bearing members, said means to cause relative axial movement between the shaft and the bearing member comprising means to apply pressure fluid to act on a surface of each of the bearing members to move the bearing members relative to the shaft and towards each other to reduce the fluid gap in opposition to the axial component of the force on the bearing member produced by the pressure fluid in the fluid gap.

5. An assembly as claimed in claim 4 and comprising further means to apply pressure fluid between the bearing members to move them apart to increase the fluid gaps, and valve means to apply pressure fluid to move the bearing members in one sense or the other.

* * * * *